US007978863B2

(12) United States Patent
Kuiri

(10) Patent No.: US 7,978,863 B2
(45) Date of Patent: Jul. 12, 2011

(54) APPARATUS AND METHOD TO PROVIDE ADVANCED MICROPHONE BIAS

(75) Inventor: Tapio Kuiri, Oulu (FI)

(73) Assignee: Nokia Corporation, Espoo (FI)

( * ) Notice: Subject to any disclaimer, the term of this patent is extended or adjusted under 35 U.S.C. 154(b) by 1220 days.

(21) Appl. No.: 11/475,403

(22) Filed: Jun. 26, 2006

(65) Prior Publication Data

US 2007/0297623 A1 Dec. 27, 2007

(51) Int. Cl.
*H04R 3/00* (2006.01)
*H04B 1/38* (2006.01)

(52) U.S. Cl. .......................... 381/111; 381/113; 455/572

(58) Field of Classification Search .................. 381/113, 381/111, 122, 120, 26, 317, 94.1, 94.6; 455/572, 455/570; 330/258, 285, 296, 199, 149, 69
See application file for complete search history.

(56) References Cited

U.S. PATENT DOCUMENTS 4,629,910 A 12/1986 Early et al. ................ 307/317 R
5,097,224 A 3/1992 Madaffari et al. ............ 330/277
5,589,799 A 12/1996 Madaffari et al. ............ 330/277
6,160,450 A 12/2000 Eschauzier et al. ........... 330/253
6,218,883 B1 4/2001 Takeuchi ...................... 327/318
6,275,112 B1 8/2001 Muza ............................ 330/296
6,353,344 B1 3/2002 Lafort ........................... 327/108
6,608,905 B1 8/2003 Muza et al. ................... 381/111
6,721,553 B2 * 4/2004 Yoshioka .................. 455/404.1
6,842,525 B1 1/2005 Mellot ............................ 381/92
6,888,408 B2 5/2005 Furst et al. .................... 330/277
2005/0151589 A1 7/2005 Fallesen ....................... 330/259

FOREIGN PATENT DOCUMENTS

EP 1096831 A2 5/2001

* cited by examiner

*Primary Examiner* — Ping Lee
(74) *Attorney, Agent, or Firm* — Harrington & Smith

(57) ABSTRACT

A circuit includes a differential amplifier having a first input for coupling to a first terminal of a microphone and a second input for coupling to a first terminal of a component having an impedance value that is substantially equal to an impedance value of the microphone, where a second terminal of the microphone and a second terminal of the component are coupled to circuit ground. The circuit further includes a first resistance having a first node coupled to a source of microphone bias voltage and a second node coupled to the first terminal of the microphone; and a second resistance having a first node coupled to the source of microphone bias voltage and a second node coupled to the first terminal of the component. Operation of the differential amplifier results in attenuating or suppressing common mode noise and interference present in the microphone bias voltage and in the common potential.

16 Claims, 2 Drawing Sheets

APPARATUS AND METHOD TO PROVIDE ADVANCED MICROPHONE BIAS

TECHNICAL FIELD

The exemplary embodiments of this invention relate generally to acoustic transducers and circuitry for same and, more specifically, relate to circuits and methods for inputting and amplifying an electrical signal generated by a biased microphone.

BACKGROUND

A microphone for transducing a user's speech into an electrical signal is a widely used component in many devices, such as wireless communications devices including cellular phones. The analog output signal from the microphone is typically applied to amplification circuitry for increasing the signal level, and the amplified signal may then be applied to an analog-to-digital converter (ADC) to generate a digital representation of a user's speech, or in general any acoustic signal waveform including music.

As can be appreciated, the amplification circuitry should provide a good signal-to-noise ratio (SNR) so as to accurately and faithfully reproduce the user's speech. However, as devices that contain a microphone become smaller and more compact there is an increased possibility of internally generated noise signals adversely affecting the SNR. In general, as more functionalities use same resources, such as a ground plane, interference cancellation in and due to the ground plane becomes a more important issue.

The following U.S. patents are all illustrative of conventional microphone amplification circuitry: U.S. Pat. No. 4,629,910, "High Input Impedance Circuit", Early et al.; U.S. Pat. No. 5,097,224, "Self-Biasing, Low Noise Amplifier of Extended Dynamic Range", Madaffari et al.; U.S. Pat. No. 5,589,799, "Low Noise Amplifier for Microphone", Madaffari et al.; U.S. Pat. No. 6,160,450, "Self-Biased, Phantom-Powered and Feedback-Stabilized Amplifier for Electret Microphone", Eschauzier et al.; U.S. Pat. No. 6,218,883, "Semiconductor Integrated Circuit for Electric Microphone", Takeuchi; U.S. Pat. No. 6,275,112 B1, "Efficient Microphone Bias Amplifier with High Output Voltage/Current Capability and Excellent PSRR", Muza; U.S. Pat. No. 6,353,344 B1, "High Impedance Bias Circuit", Lafort; U.S. Pat. No. 6,608,905 B1, "Microphone Bias Current Measurement Circuit", Muza et al.; U.S. Pat. No. 6,842,525 B1, "Signal Amplification Circuit and Process for Neutralizing Noise from a Power Supply Voltage", Mellot; and U.S. Pat. No. 6,888,408, B2, "Preamplifier for Two Terminal Electret Condenser Microphones", Fürst et al. Reference can also be made US 2005/0151589 A1, "Amplifier Circuit for Capacitive Transducers", Fallesen, and to EP 1 096 831 A2, "Semiconductor Amplifying Circuit and Semiconductor Electret Condenser Microphone", Takeuchi et al.

The "electret microphone" referred to in several of the foregoing patent documents is widely used type of condenser microphone that has a permanently charged dielectric (electret) between two parallel metal plates (electrodes), one of which is attached to a diaphragm. The diaphragm moves in response to the pressure or particle velocity of sound waves, thereby changing the distance and, therefore, the capacitance, between the diaphragm and its electrode, or backplate. Since the amount of charge is fixed, the voltage between the diaphragm and backplate changes in a manner which is inversely proportional to the change in capacitance. A suitable model for an electret microphone is a capacitor $C_{electret}$ connected in series with a voltage source $V_{electret}$. The electret microphone typically includes an active element such as a FET, and thus requires a source of bias voltage to operate.

SUMMARY OF THE EXEMPLARY EMBODIMENTS

The foregoing and other problems are overcome, and other advantages are realized, in accordance with the non-limiting and exemplary embodiments of this invention.

In accordance with an exemplary embodiment of this invention there is provided a circuit that comprises a differential amplifier having a first input for coupling to a first terminal of a microphone and a second input for coupling to a first terminal of a component having an impedance value that is substantially equal to an impedance value of the microphone, where a second terminal of the microphone and a second terminal of the component are coupled to circuit ground; a first resistance having a first node coupled to a source of microphone bias voltage and a second node coupled to the first terminal of the microphone; and a second resistance having a first node coupled to the source of microphone bias voltage and a second node coupled to the first terminal of the component.

Further in accordance with an exemplary embodiment of this invention there is provided a device that includes a microphone; a differential amplifier having a first input for coupling to a first terminal of a microphone and a second input for coupling to a first terminal of a component having an impedance value that is substantially equal to an impedance value of the microphone, where a second terminal of the microphone and a second terminal of the component are coupled to circuit ground; a first resistance having a first node coupled to a source of microphone bias voltage and a second node coupled to the first terminal of the microphone; and a second resistance having a first node coupled to the source of microphone bias voltage and a second node coupled to the first terminal of the component.

Further still in accordance with an exemplary embodiment of this invention there is provided a method that includes applying a microphone bias voltage to a first terminal of a microphone through a first resistance, the microphone comprising a second terminal that is coupled to a common potential, while simultaneously applying the microphone bias voltage through a second resistance that is coupled to the common potential via a first terminal of a component having an impedance value that is substantially equal to an impedance value of the microphone. The method further includes operating a differential amplifier having a first input coupled to the first terminal of the microphone and a second input coupled to the first terminal of the component to attenuate common mode noise and interference present in the microphone bias voltage and in the common potential.

BRIEF DESCRIPTION OF THE DRAWINGS

The foregoing and other aspects of the teachings of this invention are made more evident in the following Detailed Description, when read in conjunction with the attached Drawing Figures, wherein.

DETAILED DESCRIPTION

Figure 1:
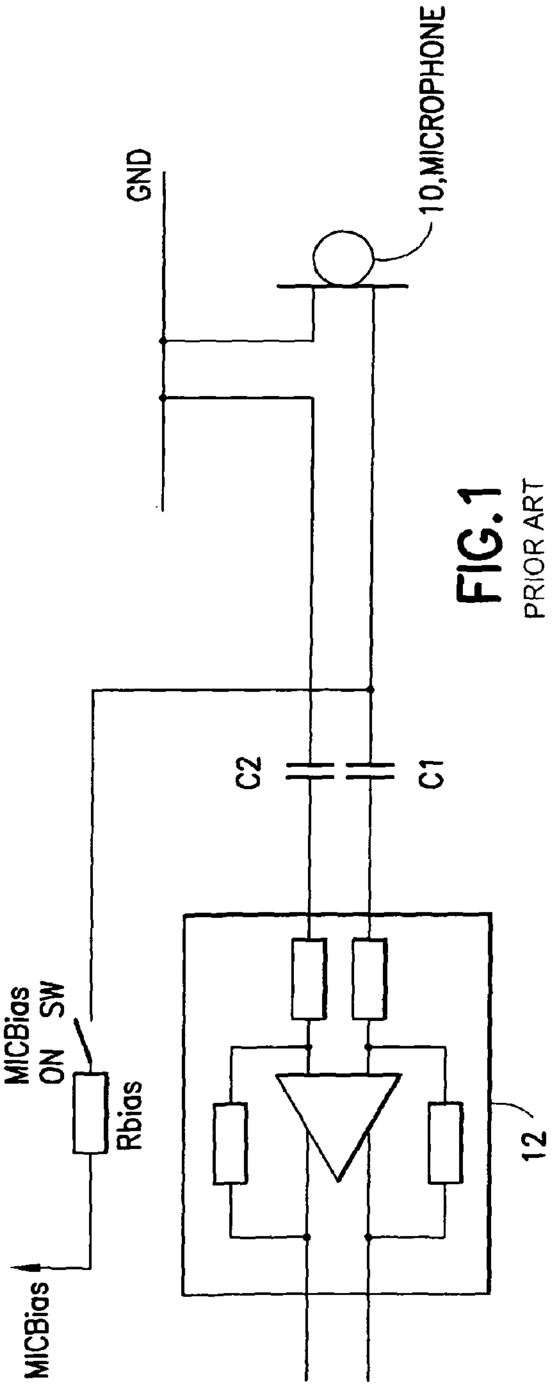
FIG.1 PRIOR ART
FIG. 1 illustrates a conventional microphone bias arrangement.

In order to gain a better understanding of the improved microphone circuitry in accordance with the exemplary embodiments of this invention, reference is first made to FIG. 1 for illustrating a conventional microphone circuit bias arrangement. In FIG. 1 a microphone 10 has a first lead connected to circuit ground (common potential) and a second lead connected to a first input of a differential amplifier 12, via a first capacitance C1, and to a terminal of a bias resistance Rbias. This latter connection may be made via a switch S1 that is closed so as to turn on the microphone bias, thereby applying a source of microphone bias voltage MICBias to the microphone 10. This can be done to conserve power, as S1 can be opened when the microphone 10 is not in use. A second input of the differential amplifier 12 is connected to circuit ground via a second capacitance C2. As may be appreciated, potential sources of noise in this circuit are ground induced noise, such as that injected by other circuitry connected to circuit ground, and power supply and other noise appearing in the MICBias voltage.

Figure 2:
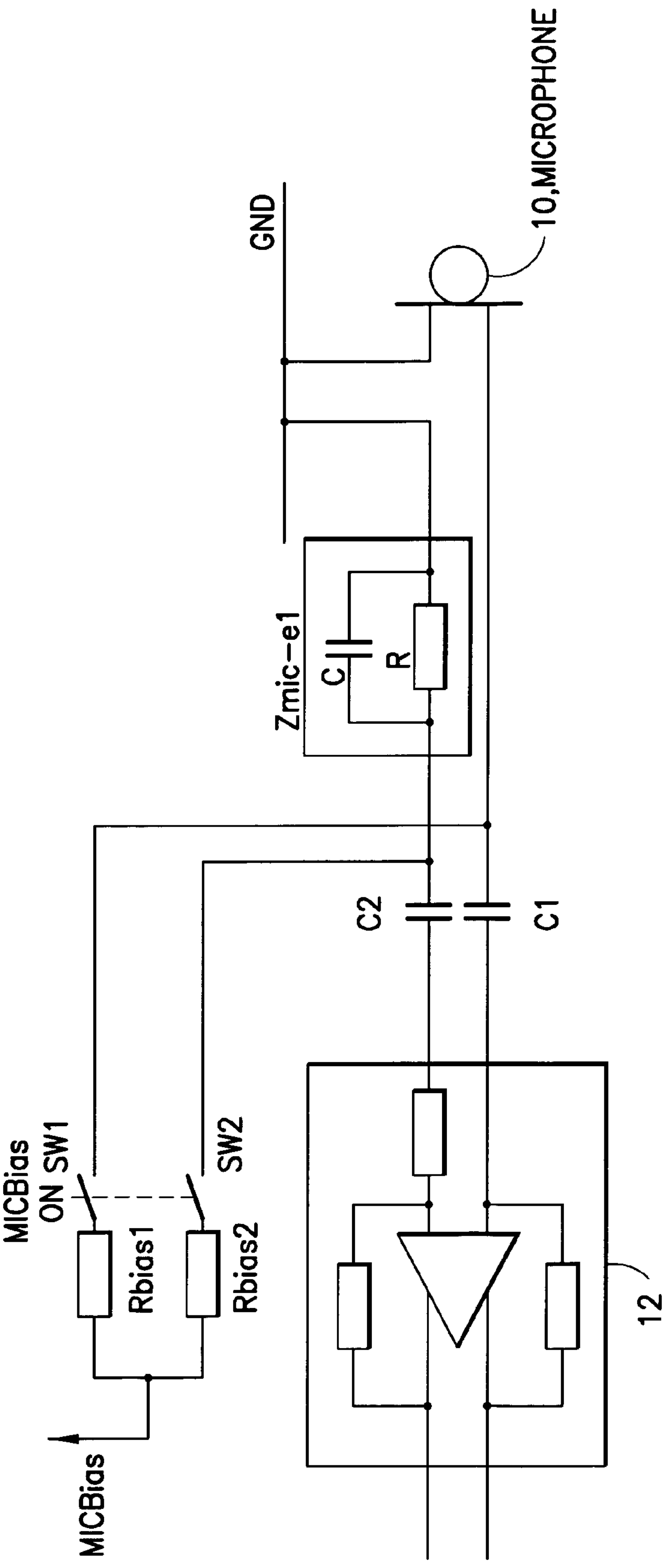
FIG. 2 shows a microphone bias arrangement in accordance with exemplary embodiments of this invention.

Reference is now made to FIG. 2, where those components found in FIG. 1 are numbered accordingly. In accordance with the exemplary embodiments of this invention a second bias resistor (Rbias2) and a second bias path are added to microphone 10. More specifically, Rbias2 (with the resistance shown in FIG. 1 now being referred to as Rbias1) is connected (via switch SW2 if used) to a point between C2 and a component or components having a value that is substantially equal to the equivalent impedance of the microphone (Zmic_eq), shown modeled for simplicity as a resistance R in parallel with a capacitance C that are both coupled to circuit ground. The Zmic_eq is preferably located as close as possible to the microphone 10.

Note that while Zmic_eq is shown schematically as the resistance R in parallel with the capacitance C, in general Zmic_eq may be modeled as a two terminal passive network containing any number of interconnected resistances, capacitances and/or inductances, so long as the resulting network impedance closely approaches or approximates the equivalent impedance of the microphone 10. Zmic_eq may be generically referred to as a component, where a first terminal of the Zmic_eq component is coupled to an input of the amplifier 12 (via C2) and to Rbias2, and where a second terminal of the Zmic_eq component is coupled to circuit ground or common.

As a result of this arrangement of FIG. 2 any noise in the MICBias voltage is "seen" as a common mode signal by the microphone differential amplifier 12, as this noise is coupled through both C1 and C2 to both of the inputs of the differential microphone amplifier 12. In a similar manner, any noise interference in the circuit ground also appears as a common mode signal at the differential amplifier 12.

In operation, the microphone amplifier 12 amplifies differential signals, but attenuates common mode signals such as the MICBias noise and ground interference. Assuming that Rbias1=Rbias2, the overall amount of attenuation is a function of how well the value of Zmic_eq matches the actual microphone impedance. Typically a 10-20 dB attenuation may be achieved. A typical value for Zmic_eq may be in a range of about 5-10 kOhm (about 5,000 to about 10,000 Ohms). The value of Rbias1 is set to provide a desired bias potential for the microphone 10, and a typical value may be about 2.2 kOhm, assuming a value of about 2.1 Volts for MICBias. As was noted above, Rbias2 is preferably made equal (to within component tolerances) to Rbias1.

Based on the foregoing description it can be appreciated that the circuit of FIG. 2 includes two voltage dividers, the first being formed by the microphone 10 and Rbias1 and the second by Zmic_eq and Rbias2. Assuming that Rbias1 and Rbias2 have the same value, and that Zmic_eq has the same value as the impedance of the microphone 10, then ground noise (such as that caused by current consumption of other circuits in combination with a non-zero ground impedance) appears as common mode noise at the input terminals of the differential amplifier 12. Due to the fact that the differential amplifier 12 only amplifies differential signals, the ground noise is not amplified. Ideally the noise is completely suppressed, however in practice the amount of suppression is a function of the circuit component tolerances and the non-ideal common mode rejection of the differential amplifier 12.

The foregoing description of the exemplary embodiments may be viewed as describing a ground-sensing arrangement used for attenuating ground-based interference, as the disclosed circuitry effectively "senses" ground through the resistor divider.

Although shown in FIG. 2 as discrete circuit components, it can be appreciated that some or all of these components may be integrated onto a common circuit substrate within an integrated circuit (IC) package, either alone or in combination with other related and unrelated circuitry.

Figure 3:
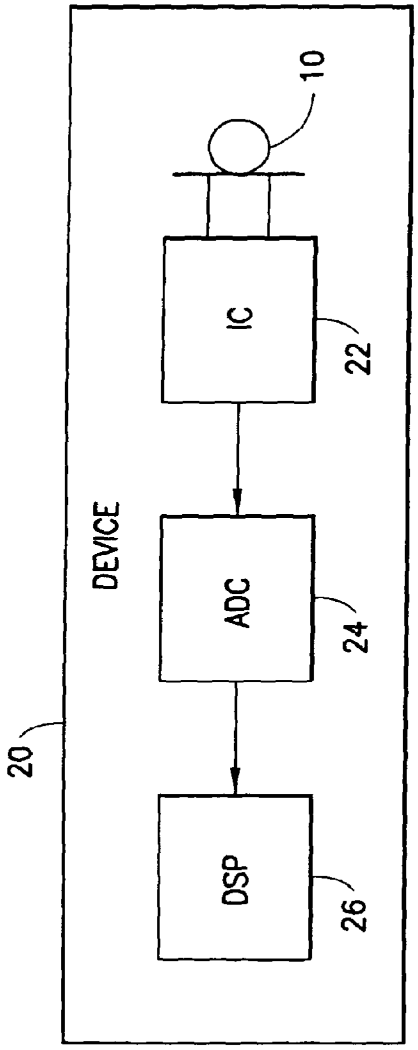
FIG. 3 shows a device that includes the microphone bias arrangement of FIG. 2.

For example, FIG. 3 shows a device 20, such as but not limited to a communications device such as a mobile terminal or cellular phone, that includes an IC 22 that is constructed so as to include the circuitry shown in FIG. 2 having an input coupled to the microphone 10. An output of the IC 22 may be connected to further circuitry, such as an ADC 24 and signal processing circuitry, such as a digital signal processor (DSP) 26, that operates on the digitized signal output from the ADC 24. In such a communications device the microphone 10 transducers a user's voice into an electrical signal that is amplified by the differential amplifier 12.

In some embodiments all or some of the further circuitry 24, 26 shown in FIG. 3 may be integrated into the same IC 22 as the circuitry shown in FIG. 2. The IC 22 may be implemented in CMOS or in any suitable process technology.

Other embodiments for the device 10 include, but are not limited to, headsets, hearing aids, computer audio input circuits and dictation machines, to name just a few. In general, any device that includes or that uses a microphone can benefit from the use of the exemplary embodiments of this invention.

Various modifications and adaptations may become apparent to those skilled in the relevant arts in view of the foregoing description, when read in conjunction with the accompanying drawings and the appended claims. For example, other differential amplifier topologies (other than the one specifically shown in FIG. 2) may be used, including an instrumentation-type differential amplifier constructed using three operational amplifiers.

There may also be additional components present in the circuit for ESD and EMC reasons. Also, the bias and switching of the bias can be implemented in various ways.

It may be further noted that it is within the scope of the exemplary embodiments of this invention to make Zmic_eq an on-chip or an off-chip variable component to enable factory tuning so as to accommodate possible variations in the actual impedance value of the microphone 10.

However, all such and similar modifications of the teachings of this invention will still fall within the scope of this invention.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A circuit, comprising:

a differential amplifier having a first input for coupling to a first terminal of a microphone and a second input for coupling to a first terminal of a component, said component comprising a resistance and at least one of a capacitance and an inductance, said component configured to have an impedance value that is substantially equal to an impedance value of the microphone, where a second terminal of the microphone and a second terminal of the component are coupled to circuit ground;

a first resistance having a first node coupled to a source of microphone bias voltage and a second node coupled to the first terminal of the microphone; and a second resistance having a first node coupled to the source of microphone bias voltage and a second node coupled to the first terminal of the component.

2. The circuit of claim 1, further comprising a first coupling capacitance coupled between the first input of the differential amplifier and the first input of the microphone and a second coupling capacitance coupled between the second input of the differential amplifier and the first terminal of the component, where said second node of said first resistance is coupled between the first coupling capacitance and the first terminal of the microphone and said second node of said second resistance is coupled between the second coupling capacitance and the first terminal of the component.

3. The circuit of claim 1, where a value of said first resistance is substantially equal to a value of said second resistance.

4. The circuit of claim 1, where said second nodes of said first resistance and said second resistance are switchably coupled to the first terminal of said microphone and to the first terminal of the component, respectively.

5. The circuit of claim 1, embodied at least in part within an integrated circuit package.

6. The circuit of claim 1, embodied within a mobile terminal.

7. An apparatus, comprising:

a microphone;

a differential amplifier having a first input for coupling to a first terminal of a microphone and a second input for coupling to a first terminal of a component, said component comprising a resistance and at least one of a capacitance and an inductance, said component configured to have an impedance value that is substantially equal to an impedance value of the microphone, where a second terminal of the microphone and a second terminal of the component are coupled to circuit ground;

a first resistance having a first node coupled to a source of microphone bias voltage and a second node coupled to the first terminal of the microphone; and a second resistance having a first node coupled to the source of microphone bias voltage and a second node coupled to the first terminal of the component.

8. The apparatus of claim 7, further comprising a first coupling capacitance coupled between the first input of the differential amplifier and the first input of the microphone and a second coupling capacitance coupled between the second input of the differential amplifier and the first terminal of the component, where said second node of said first resistance is coupled between the first coupling capacitance and the first terminal of the microphone and said second node of said second resistance is coupled between the second coupling capacitance and the first terminal of the component.

9. The apparatus of claim 7, where a value of said first resistance is substantially equal to a value of said second resistance.

10. The apparatus of claim 7, where said second nodes of said first resistance and said second resistance are switchably coupled to the first terminal of said microphone and to the first terminal of the component, respectively.

11. The apparatus of claim 7, where at least said differential amplifier and said first and second resistances are disposed within an integrated circuit package.

12. The apparatus of claim 7, where said apparatus comprises part of a communications device where said microphone transducers a user's voice into an electrical signal that is amplified by said differential amplifier.

13. The apparatus of claim 7, embodied in a mobile terminal.

14. A method, comprising:

applying a microphone bias voltage to a first terminal of a microphone through a first resistance, the first resistance having a first node coupled to the bias voltage and a second node coupled to the first terminal of the microphone, the microphone comprising a second terminal that is coupled to a common potential, while simultaneously applying the microphone bias voltage through a second resistance that is coupled to the common potential via a first terminal of a component, said component comprising a resistance and at least one of a capacitance and an inductance, said component configured to have an impedance value that is substantially equal to an impedance value of the microphone; and operating a differential amplifier having a first input coupled to the first terminal of the microphone and a second input coupled to the first terminal of the component to attenuate common mode noise and interference present in the microphone bias voltage and in the common potential.

15. The method of claim 14, where a value of the first resistance is substantially equal to a value of the second resistance.

16. The method of claim 14, executed in a mobile terminal.

* * * * *